Dec. 29, 1925.
A. GRAMBERG
1,567,940
APPARATUS FOR MEASURING STREAMS
Filed August 10, 1921
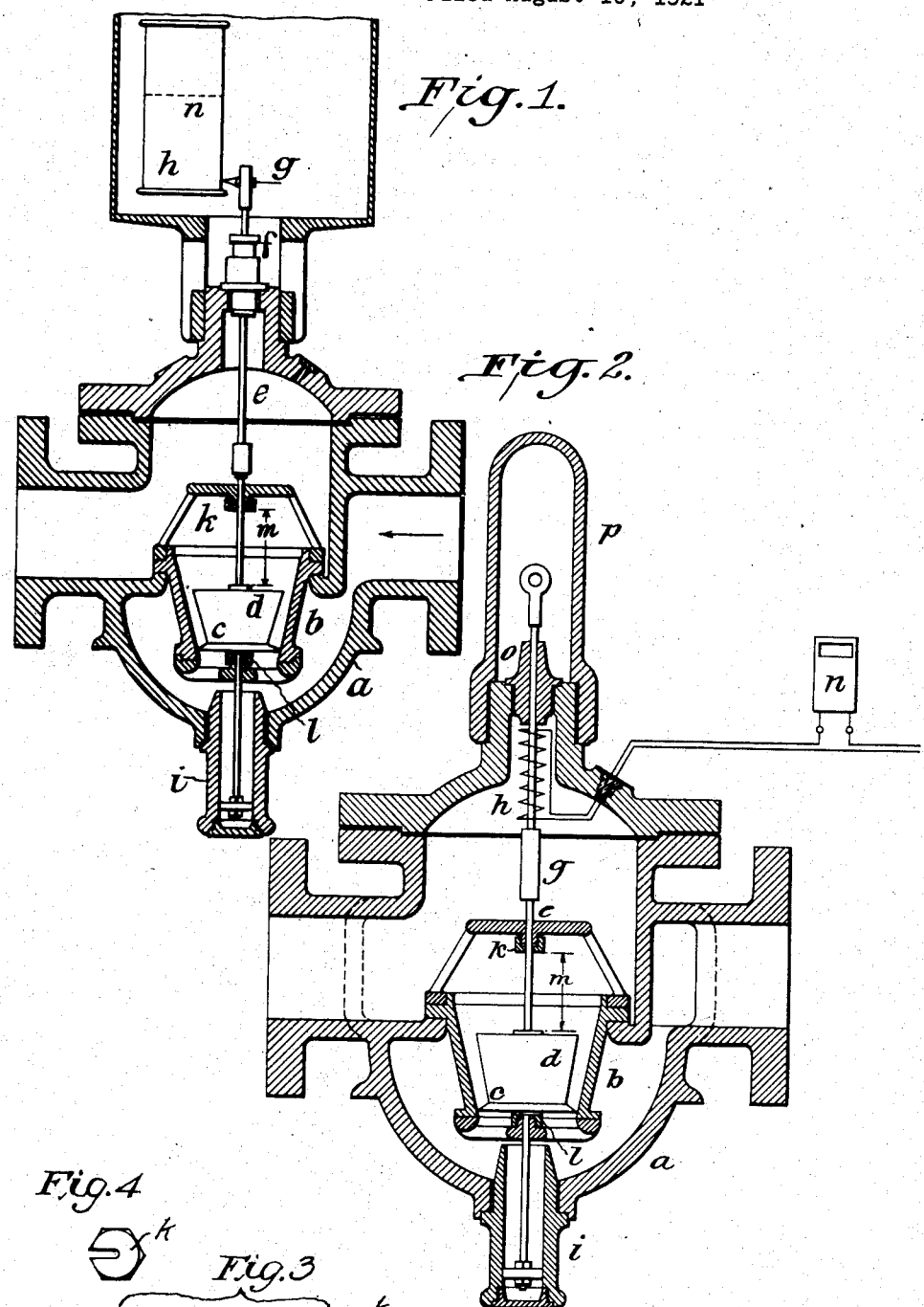
Inventor:
Anton Gramberg,
By Byrnes, Townsend & Bickenstein,
Attorneys.

Patented Dec. 29, 1925.

1,567,940

UNITED STATES PATENT OFFICE.

ANTON GRAMBERG, OF FRANKFORT-ON-THE-MAIN, GERMANY, ASSIGNOR TO FARB-WERKE VORM. MEISTER LUCIUS & BRÜNING, OF HOCHST-ON-THE-MAIN, GERMANY, A CORPORATION OF GERMANY.

APPARATUS FOR MEASURING STREAMS.

Application filed August 10, 1921. Serial No. 491,203.

*To all whom it may concern:*

Be it known that I, ANTON GRAMBERG, Ph. D., professor, a citizen of Germany, residing at Frankfort-on-the-Main, Germany, have invented certain new and useful Improvements in Apparatus for Measuring Streams, of which the following is a specification.

In all apparatus for measuring streams, for instance a stream of steam, it is most essential that their working and the exactness of measurements should be subject of continuous control without having to interrupt their working, for instance without having to shut off the steam.

My present invention relates to an apparatus for measuring streams of the kind having a float, which apparatus permits the said control or inspection while the apparatus is in operation. For this purpose the float is fitted directly with a load (thus avoiding the known roller device) and the stem of the float extends in a straight line to without the casing in such a manner that by means of this stem the power necessary for the controls can be applied to the float.

In the accompanying drawings, Fig. 1 is a vertical section through a measuring device embodying my invention.

Fig. 2 is a vertical section through another embodiment of my invention.

Fig. 3 is an elevation of a plurality of sets of adjusting nuts, and

Fig. 4 is an elevation of one of the adjusting nuts.

The drawing Figure 1 shows for instance a mode of constructing the new measuring apparatus. In the casing $a$, which is in the form of a valve, there is fitted a cone-shaped part $b$ in which the float $c$ moves axially. The float is lifted by the steam in opposition to the charge of the load $d$. By means of the rod $e$ which has the same axis as the float and which is extended to without the apparatus through the stuffing box $f$, the indicating device is actuated, consisting of the recording pen $g$ which plays in front of the paper drum $h$. This arrangement permits the raising and lowering of the float by catching it at the recording pen $g$ and thus makes it possible to control its working and proper position. The dash pot $i$ damps the movement of the load in the known manner.

Instead of the above described indicating device there may also be used, for instance, an electric device by substituting a sliding-contact for the recording device $g$ which contact closes electric resistance coils whereby a current indicator or counter is actuated. When using alternating current, the indicating device may also be constructed in the usual manner so as to fit in the place of the recording device $g$ an iron core which is introduced more or less into a choking coil whereby the current in the coil will be varied. The said iron core and choking coil may also be placed within the casing so that for actuating the indicator device it is only necessary to conduct an electric wire to the outside of the casing. Nevertheless the stem of the float is extended to without the apparatus having at its end a handle which affords a simple test of the degree of mobility of the float.

The above mentioned construction of the apparatus with the choking coil or another registering device actuated by the stem from inside the casing may be modified and improved by eliminating entirely the stuffing box, although the stem of the float is extended to without the apparatus in order to be able to control the mobility of the float. For this purpose there is no stuffing box, but a simple guide is provided for the stem of the float. Loss of liquid past the guide is avoided by normally closing tightly the path of possible escape by means of a cap screwed on to the casing so as to cover the said long guide and the portion of the stem which extends through it. When the said cap is removed the stem of the float can be manipulated for the above mentioned controlling purposes, whereupon the cap is replaced.

The accompanying drawing Figure 2 is an axial section through a meter having the last mentioned improvement. $a$ is the casing, $b$ the measuring cone and $c$ the float moving axially in the latter and loaded by the weight $d$. The stem $e$ extends through the guide $o$, and the cap $p$ provides the tight closure hereinbefore described. A dash-pot $i$ damps the movement. $k$ and $l$ are screw nuts constituting interchangeable stops. In the meter shown the measuring device comprises an iron core $g$ carried by the stem $e$ and movable more or less into and out of the choking coil $h$ as the stem rises and falls. The coil carries alternating current the fluctuations of which, due to the varying positions of $g$, are indicated or counted by the recorder $n$. For this device may be substituted for instance the known mechanical device in which the stem actuates a lever within the casing, the movement of which is transmitted to without the apparatus as the rotation of a spindle extending through a stuffing box or through a cone stuffing.

In the new apparatus by manipulating the float its working can be controlled and by lifting the float to its final position it can be ascertained whether the adjustment of the indicating and counting device is correct.

The parts guiding the float, which were hitherto always constructed only as a central guide, are made for the purpose of my invention to serve for limiting the stroke. In Figure 1 and Figure 2 the limit of the stroke is effected by the two screw-nuts $k$ and $l$ in such a manner that the float can rise to the point $m$. The paper sheet on the drum $h$ shows the end-line $n$ corresponding to the maximum passage of steam.

For the purpose of regulating the range of movement of the piston valve, without, however, changing the length of the stroke itself, a plurality of sets of adjusting nuts are provided. Each set comprises a pair of nuts, $k$, $l$, which may be positioned to provide upper and low stops, respectively. The combined axial lengths of all pairs of nuts is constant but the respective lengths of the nuts, $k$, $l$, are different for each set. As is illustrated in Fig. 3, the adjacent faces of any given set of nuts, when the same are properly positioned upon the device, are spaced apart by a distance which is equal to the length of stroke $m$, plus the thickness of the piston valve. To permit the ready removal and interchange of the nuts they are slotted as indicated in Fig. 4, the width of the slot being slightly in excess of the diameter of the stem $e$.

The cone-shaped part is preferably made detachable from the remaining part of the apparatus in order to permit the substitution of another cone for it, in case the measuring range has been incorrectly chosen. The casing $a$ preferably includes a removable part in alignment with the conical member to afford access to and removal of the latter. It is thus a simple matter to correct a defect of this kind without necessitating the exchange of the device as a whole.

Having now described my invention, what I claim is:

1. Apparatus for measuring fluids comprising means defining a conduit, a piston valve mechanism constructed and arranged in the conduit to vary the effective cross-sectional area thereof in proportion to the volume of fluid passing per unit of time, a scale indicating mechanism associated with said scale and controlled by the movement of said piston valve, abutments at opposite sides of said piston valve making the range of movement thereof exactly equal to that required to move said indicating mechanism from the zero line to the end line of said scale, and means operable from without the conduit to move said piston valve against the abutment which limits the opening movement thereof.

2. Apparatus for measuring fluids comprising means defining a conduit, a piston valve mechanism constructed and arranged in the conduit to vary the effective cross-sectional area thereof in proportion to the volume of fluid passing per unit of time, a scale, indicating mechanism associated with said scale and controlled by the movement of said piston valve, abutments making the range of movement of said piston valve equal to the range required to move said indicating mechanism over said scale, and a rigid extension on said piston valve extending to a point outside said conduit, whereby said piston valve may be moved against an abutment to bring said indicating mechanism to its end line position.

3. In apparatus of the class described, the combination of a piston valve and means for variably displacing the range of movement thereof, said means comprising a plurality of pairs of abutment members, the members of each pair having different lengths and the combined lengths of all pairs being equal, a stationary part on each side of the piston in the path of movement thereof for receiving any one of the abutment members.

4. Arrangement according to claim 4 in which the piston has stems extending in opposite directions and the stationary parts are bearings for the stems, the abutment members being radially slotted for attachment to and removal from the stationary parts while the piston is in operative position.

In testimony whereof, I affix my signature.

ANTON GRAMBERG.